Aug. 15, 1933.   J. S. BOWERS   1,922,470
ATTACHMENT FOR GASOLINE TANKS
Filed March 24, 1932
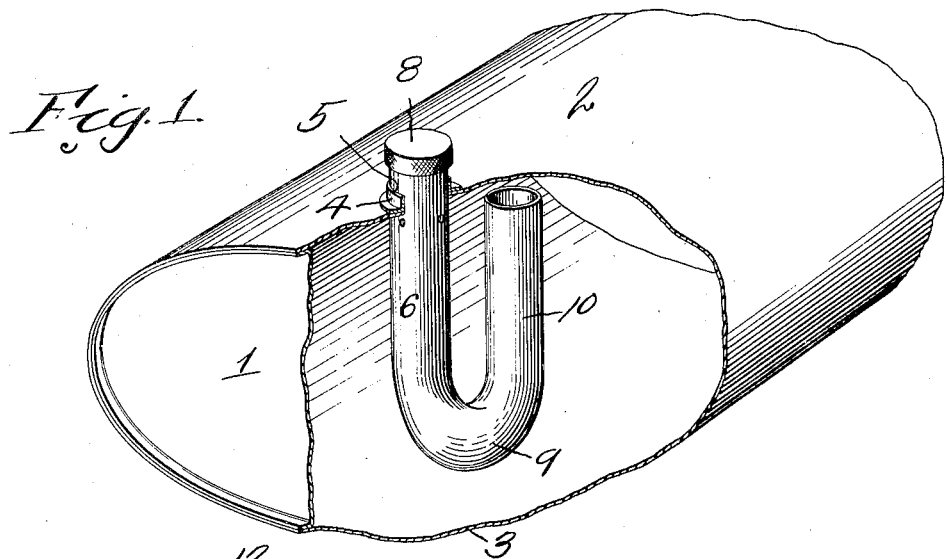
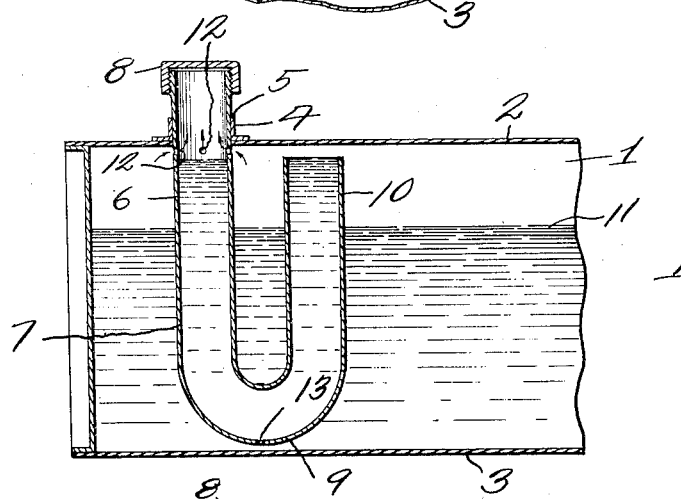
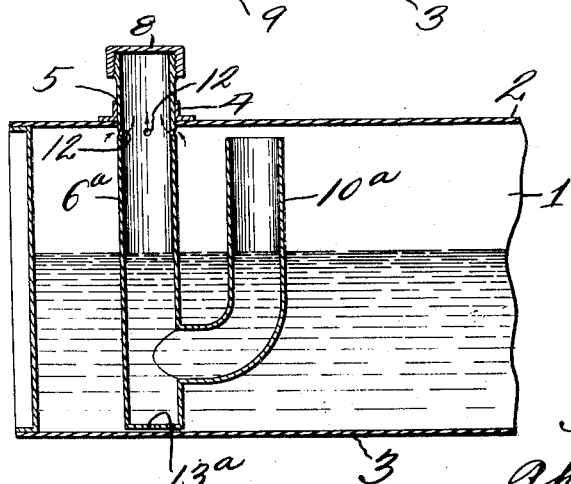
INVENTOR
Joseph S. Bowers
BY
ATTORNEY Patented Aug. 15, 1933

1,922,470

UNITED STATES PATENT OFFICE 1,922,470

ATTACHMENT FOR GASOLINE TANKS

Joseph S. Bowers, Tulsa, Okla.

Application March 24, 1932. Serial No. 601,035

1 Claim. (Cl. 220—86)

The invention relates to attachments for the filling openings of gasoline tanks, and has for its object to provide a device of this character constructed in a manner whereby when a flexible siphoning pipe is forced into the device, the end thereof will be deflected against the upper side of the tank, thereby preventing the same from entering the fluid for the siphoning operation.

A further object is to form the device from a U-shaped tubular member, one arm of which extends through the upper wall of the tank and the other wall extending vertically and terminating adjacent to but slightly spaced from the upper wall, whereby during a filling operation, fluid will flow into the tank. Also to provide apertures in the top carried arm adjacent the upper wall of the tank and above the discharge end of the other arm of the tubular member for allowing an exhaust of air and preventing compression of air in the tank during the filling operation.

A further object is to provide a relatively small aperture in the U-shaped member at its lower end through which liquid may flow into the tank chamber at the end of the filling operation for allowing the liquid in the U-shaped member to assume the level of the liquid in the tank and also allowing complete drainage of the U-shaped member when the fluid within the tank is drained therefrom.

A further object is to provide the U-shaped member with a downwardly extending straight extension terminating adjacent the bottom of the tank, thereby allowing accurate measuring of the amount of liquid in the tank by an insertion of a tube through the filling opening.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of a portion of a conventional form of automobile fuel tank, showing the device applied thereto.

Figure 2 is a vertical longitudinal sectional view through one end of the tank and the theft prevention device.

Figure 3 is a view similar to Figure 2, showing a modified form of theft prevention device.

Referring to the drawing, the numeral 1 designates a conventional form of gasoline tank of the type used in connection with motor driven vehicles, 2 the top of the tank and 3 the bottom.

It is a common practice for unauthorized persons to remove the filling opening cap of gasoline tanks and insert a flexible tube therein for siphoning the gasoline from the tank, and to obviate this difficulty the present device is primarily designed. Tank 2 is provided with an annular flange 4, in which may be secured, for instance by welding at 5, the vertical tubular arm 6 of the theft prevention device 7. The arm 6 extends above the tank and is provided with a closure cap 8. Arm 6 extends downwardly into the tank and is provided with a return bend 9, which terminates in a vertically disposed tubular arm 10, which terminates spaced from but adjacent the top 2 of the tank in a position whereby when a flexible tube is inserted through the tubular arm 6, it will be deflected upwardly against the upper side 2 of the tank, thereby preventing the tube end from entering the fluid within the tank, which is indicated by the numeral 11. In most devices of this character the tank becomes airbound during the filling operation as their air escape ports are spaced downwardly from the top a considerable distance. In the present device the air ports 12 are disposed adjacent the under side of the top 2 of the tank and above the discharge end of the tubular arm 10. During the filling operation the gasoline enters the tube 6, fills the same and overflows at the upper end of the tubular arm 10 into the tank. During this operation the device is substantially full as shown in Figure 2, however it will be noted the device will not become airbound as the liquid level in the tank 1 rises as the escape ports 12 are at the top of the tank.

After the filling operation the theft prevention device is substantially full, however the liquid level therein will, by gravity, assume the liquid level in the tank by flowing through a discharge aperture 13 at the return bend portion 9 of the device. At the same time this aperture allows all of the fluid in the theft prevention device to flow therefrom into the tank and be consumed for fuel purposes. The aperture 13 is relatively small so that liquid will flow very slowly into the theft prevention device in a quantity not sufficient for a siphoning operation of any volume.

Referring to Figure 3 wherein a modified form is shown, in this form the tubular arm 6a extends downwardly and terminates adjacent the bottom 3 of the tank. The bottom of the tubular arm 6 is provided with an aperture 13a for the same purpose as the aperture 3, however by providing this straight section 6a, it is obvious a measuring rod may be placed therein for ascertaining the content of the tank. Extending outwardly and upwardly from one side of the tubular member 6a is an arm 10a, which terminates adjacent the top 2 of the tank for discharging fluid into the tank. It will be noted that in this form a siphoning tool, when placed in the tube 6a will go to the bottom thereof, however as the aperture 13a is relatively small insufficient liquid would flow into the device for maintaining a siphoning operation.

From the above it will be seen that a theft prevention device is provided for motor vehicle gasoline tanks, which device is simple in construction, provided with means whereby a siphoning operation can not be maintained, and also provided with an exhaust means adjacent its upper end whereby the tank can be completely filled without becoming airbound incident to compression of air in the upper side of the tank.

The invention having been set forth what is claimed as new and useful is:—

The combination with the top of a gasoline tank, the bottom of the gasoline tank, of a theft prevention device, said theft prevention device comprising a vertically disposed tubular member carried by the top and terminating adjacent the bottom of the tank, an aperture in the lower end of said tubular member, said tubular member adjacent the top being perforated of a size whereby liquid will flow into and from the tubular member in a relatively small volume thereby preventing a sustained siphoning operation, a branch tubular pipe carried by the first mentioned pipe and extending upwardly towards the top of the tank and forming a discharge means for the device into the tank adjacent the top of the tank and above the perforations.

JOSEPH S. BOWERS.